United States Patent [19]

Swisher, Sr.

[11] 4,115,019

[45] Sep. 19, 1978

[54] METAL COUPLING OR OTHER METAL ATTACHMENT AND METHOD FOR WELDING IT TO A METAL TUBE OR OTHER METAL SUPPORT

[75] Inventor: Calvin C. Swisher, Sr., Genesee Depot, Wis.

[73] Assignee: Wisconsin Centrifugal, Inc., Waukesha, Wis.

[21] Appl. No.: 779,286

[22] Filed: Mar. 18, 1977

[51] Int. Cl.$^2$ ................................................ B25G 3/34
[52] U.S. Cl. ................................ 403/270; 29/157 T; 228/170
[58] Field of Search .............. 403/265–272; 228/165, 168, 170; 29/157 T; 219/98, 99

[56] References Cited

U.S. PATENT DOCUMENTS

| 2,163,209 | 6/1939 | Pungel | 403/270 |
| 2,848,954 | 8/1958 | Aversten | 403/272 |

FOREIGN PATENT DOCUMENTS

| 224,693 | 3/1943 | Switzerland | 228/165 |

Primary Examiner—Wayne L. Shedd
Attorney, Agent, or Firm—Charles B. Cannon

[57] ABSTRACT

A ferrous or like metal coupling or other metal attachment, such as a heady round lug, includes a generally cylindrical body having a beveled base and a divider land or keel extends diametrically across the base and projects downwardly therefrom and divides the beveled base into two generally coequal component weld surface areas on opposite sides of the divider land or keel. The body of the metal coupling or other metal attachment, such as a heady round metal lug, is positioned at a desired and preselected point on the external surface of a metal pipe or tube whereupon the metal coupling or other metal attachment is preliminarily or tack-welded to join the divider land or keel to the external surface of the metal pipe or tube. The metal pipe or tube with the metal coupling, or other metal attachment, thus preliminarily or tack-welded thereto is then rotated alternately, or back and forth, to position each of the component weld surface areas in a generally vertical plane, and with the axis and progression of the weld in a generally horizontal plane, with weld metal being applied generally from above, first in one of the component weld surface areas and then in the other component weld surface area, and this operation is repeated or continued in successive steps or passes with additional weld metal being applied in increments at each successive step or pass until the welding of the metal coupling, or other metal attachment, to the metal pipe or tube has been completed.

8 Claims, 21 Drawing Figures

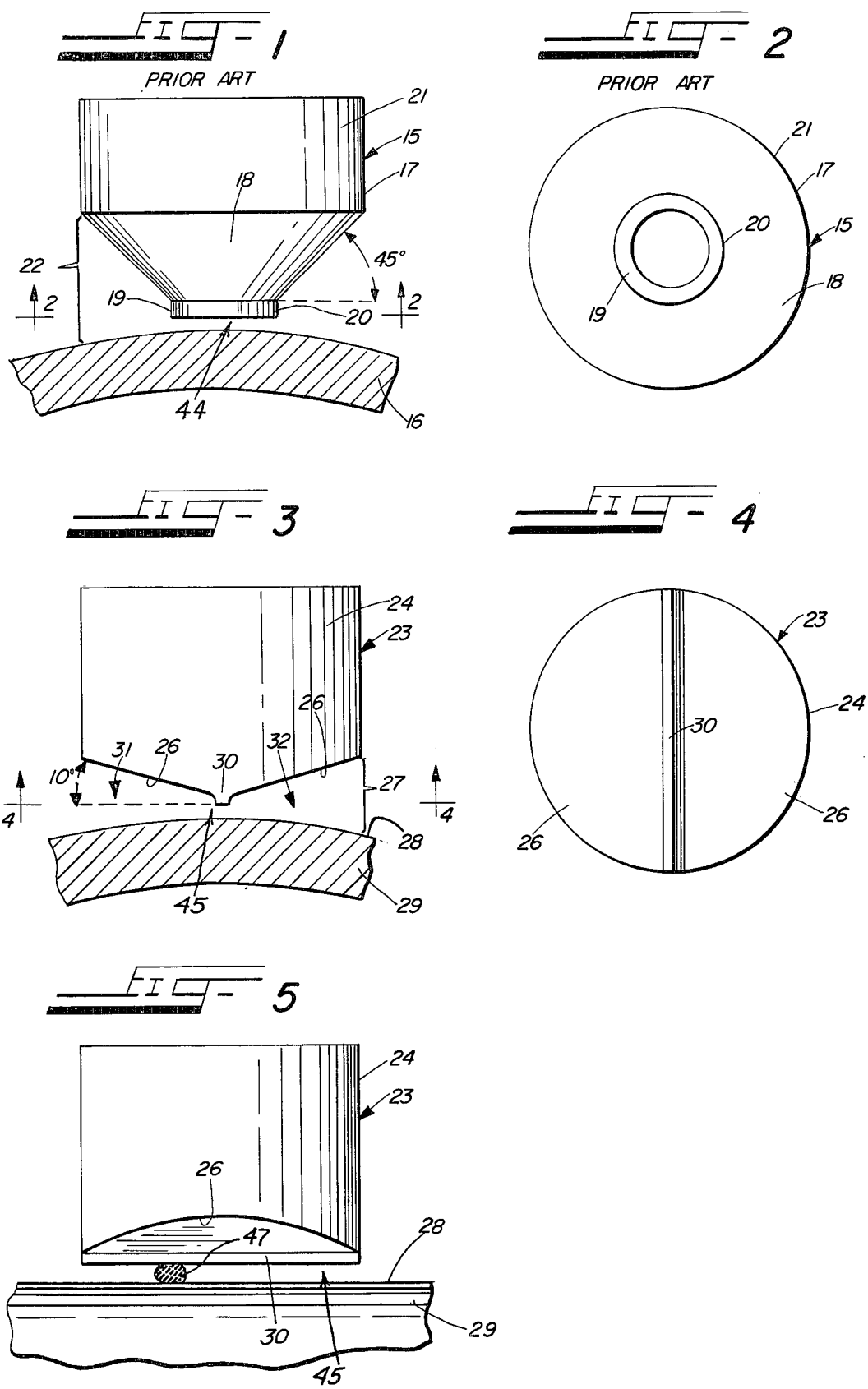

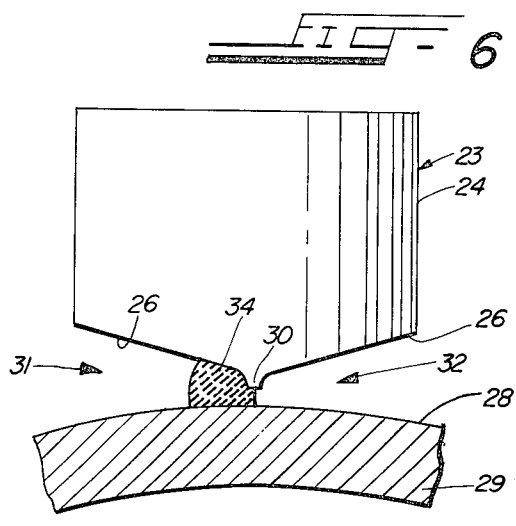
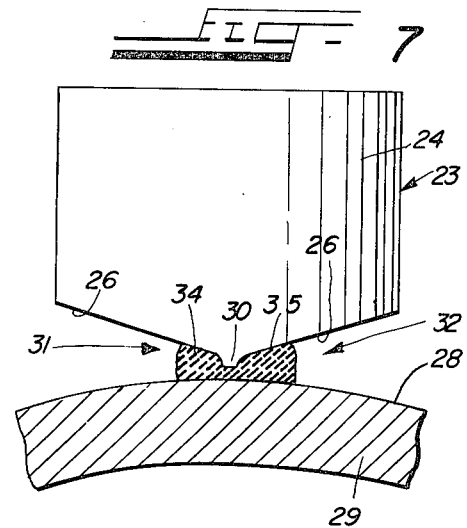
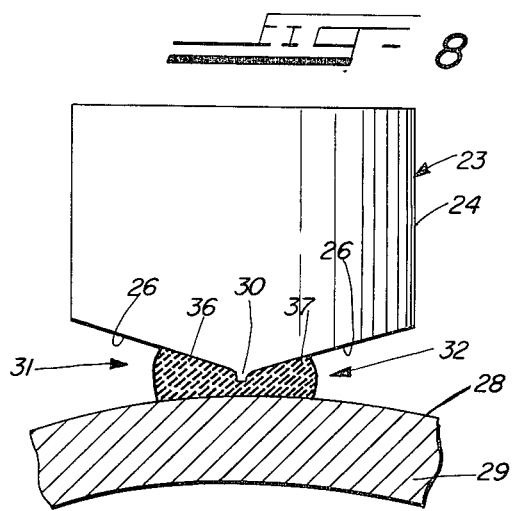
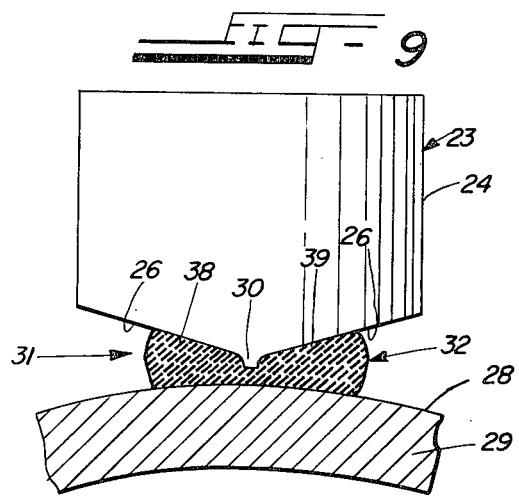
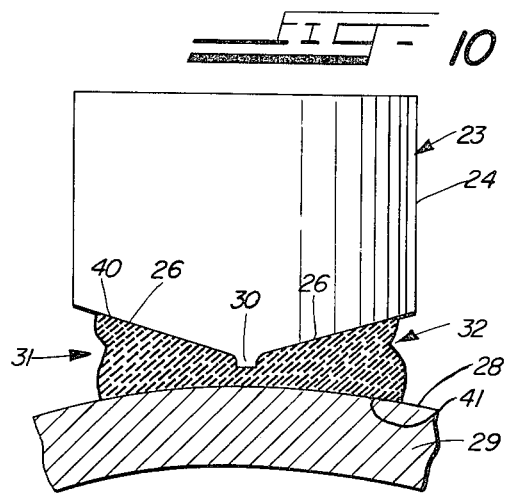
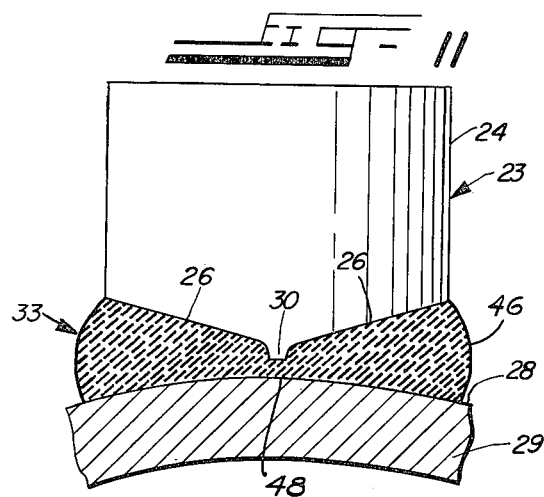

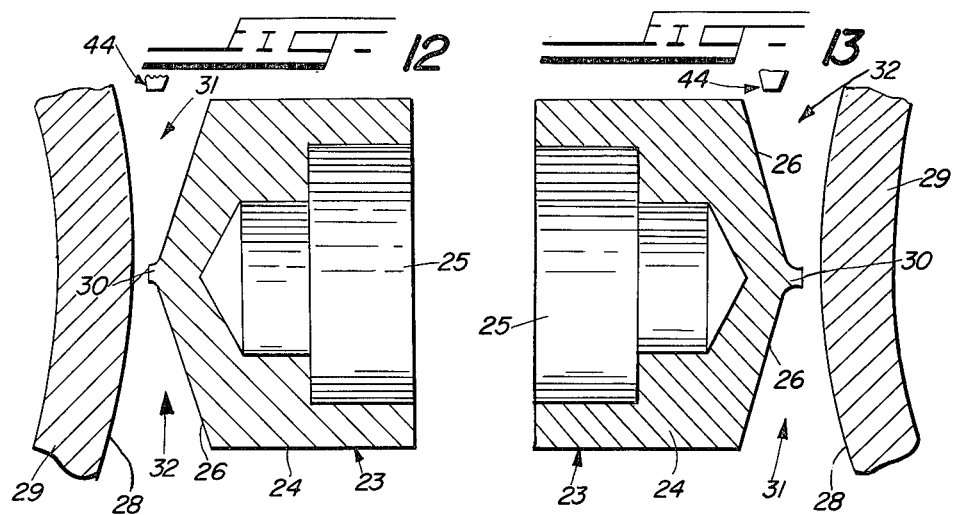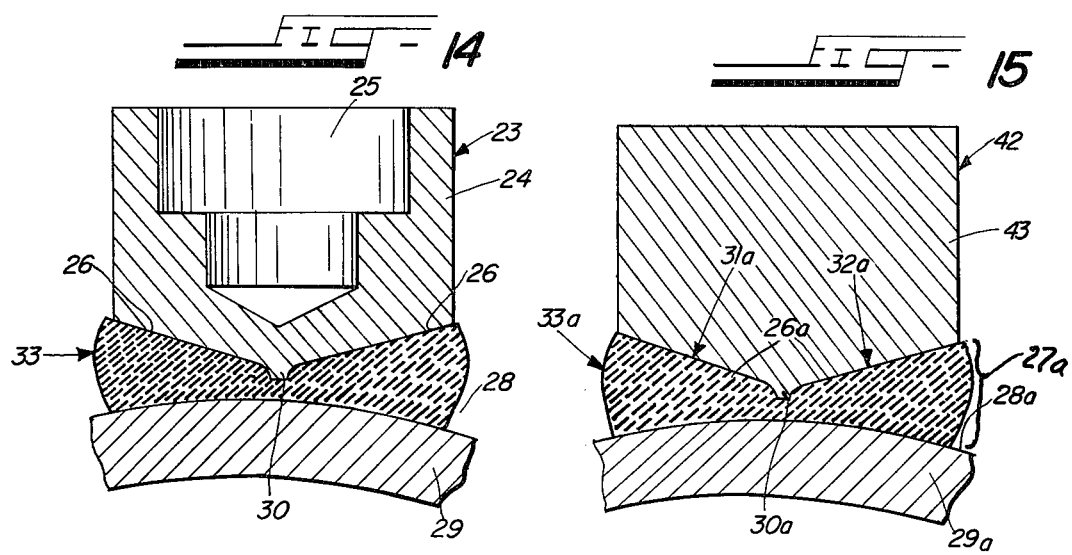

METAL COUPLING OR OTHER METAL ATTACHMENT AND METHOD FOR WELDING IT TO A METAL TUBE OR OTHER METAL SUPPORT

BACKGROUND OF THE INVENTION

Heretofore in the art metal couplings have been welded to the external surface of a metal pipe or tube to enable the metal coupling, when welded to the metal pipe or tube to have a passage drilled therethrough into the metal pipe or tube to provide an inlet or an outlet to or from the interior of the metal pipe or tube so that the metal pipe or tube with the metal coupling welded thereby may be used in the petroleum and petrochemical industries, the chemical industries, in general, and in other industrial uses. Such prior metal couplings have commonly included a generally cylindrical metal body, sometimes having a central internal cavity, and with the body thereof having a relatively steep or sharply inclined beveled base at the bottom of which, and extending centrally thereof, an annular flange has been provided and projects downwardly from the beveled base of the body of the metal coupling. In welding such prior metal couplings to the external surface of a metal pipe or tube the coupling is positioned at the desired and preselected point on the external surface of the metal pipe or tube and welded thereto by applying the weld metal circumferentially around the annular flange on the base of the coupling and filling in with weld metal the annular weld surface area formed and defined by and between the annular flange on the base of the coupling, the side walls of the beveled base, and the external peripheral wall surface of the metal pipe or tube.

However, in the practice of the prior art, as discussed above, it has been found to be very difficult for the welder to form a satisfactory weld joint between the beveled base of the coupling, the annular flange, and the external surface of a metal pipe or tube since in welding such prior metal couplings to a metal pipe or tube the welder must attempt to apply the weld metal circumferentially and uniformly in and around the weld area between the annular flange on the base of the body of the coupling, the beveled surface of the base, and the external surface of the metal pipe or tube, while working with the axis of the metal coupling in a generally horizontal plane and with the welding groove in a vertical plane. This prior practice is difficult for the welder to carry out and has frequently resulted in the welder making unsatisfactory weld joints which have lacked uniformity and have had imperfections therein, including cracks or fissures. Other welding positions could also be used, but they also suffer the same disadvantages. In addition, the prior practice has been expensive from the standpoint of time, labor and materials required in the welding operation because of the sizeable welding groove which must be filled when using this practice.

Similar problems have been experienced heretofore in the prior art of welding other metal attachments, such as solid heavy round metal lugs, to the external surfaces of metal pipes or tubes.

OBJECTS OF THE INVENTION

An object of the present invention is to provide a new and improved metal coupling and a new and improved method for welding the new metal coupling to a metal pipe or tube.

A further object of the invention is to provide a new and improved metal coupling and a new and improved method for welding the metal coupling to a metal pipe or tube and which in use overcomes the problems and difficulties heretofore experienced in the prior art including those hereinbefore pointed out.

An additional object of the invention is to provide a new and improved method for welding a metal attachment, such as a metal coupling, or a solid heavy round metal lug, to a metal pipe or tube in which the weld metal is applied to the beveled base of the metal coupling or other metal attachment and the adjacent external surface of the metal pipe or tube while the welder is able to work and works in a generally vertical plane and with the weld axis and progression in a generally horizontal direction. In this manner the welder is able to overcome the difficulties heretofore experienced in the use of the prior metal couplings and prior methods of welding such prior metal couplings, or other metal attachments, to a metal pipe or tube in which the welder attempts to apply the weld metal circumferentially in the weld area defined by the annular flange on the beveled base of the metal coupling, or other metal attachment, the beveled bottom surface of the metal coupling, or other metal attachment, and the adjacent external wall surface of the metal pipe or tube.

A further object of the invention is to provide a novel metal attachment in the form of a metal coupling or solid metal lug including a generally cylindrical body having a beveled base diametrically and centrally across which there extends a divider land or keel which extends downwardly from the beveled base and divides the weld surface of the beveled base into two substantially coequal component weld surface areas.

An additional object of the invention is to provide a novel welding method for welding the two substantially coequal component weld surface areas of the beveled base of the metal coupling or other metal attachment to the external wall surface of a metal pipe or tube by first preliminarily or tack-welding the metal coupling or other metal attachment to the external surface of the metal pipe or tube and then alternately rotating the metal pipe or tube back and forth to position each of the component weld surface areas successively in a generally vertical plane and with the weld axis and progression in a generally horizontal orientation, and applying weld metal in each of the component weld surface areas in successive increments at each successive step or pass until the welding operation has been completed.

Still another object of the invention is to provide a novel combination of a new and improved metal coupling, or other metal attachment, and a metal pipe or tube, or like metal support, and a new and improved weld joint therebetween.

Still another object of the invention is to provide a new and improved welding method which assures a complete and satisfactory weld joint between the external peripheral wall surface of the metal pipe or tube and the beveled base of the new coupling on both sides of the divider land or keel on the beveled base of the new coupling.

Other objects will appear hereinafter.

DESCRIPTION OF FIGURES IN THE DRAWINGS

FIG. 1 is a view partly in elevation and partly in section illustrating a prior art metal coupling and a metal pipe or tube to which it is to be welded;

FIG. 2 is a bottom plan view, on line 2—2 in FIG. 1, illustrating the frusto-conical shaped beveled base of the prior art metal coupling shown in FIG. 1 and the annular flange at the bottom thereof;

FIG. 3 is a view, partly in elevation and partly in section, illustrating a preferred embodiment of the new metal coupling arranged in position to be welded to a metal pipe or tube;

FIG. 4 is a bottom plan view on line 4—4 in FIG. 3;

FIG. 5 is a side elevational view of the new metal coupling shown in FIGS. 3 and 4 as positioned on the external surface of a metal pipe or tube and illustrating the first step in the new method of welding the new metal coupling to a metal pipe or tube and showing the metal coupling preliminarily or tack-welded to the metal pipe or tube;

FIG. 6 is a side elevational view, partly in section, of the parts shown in FIG. 5 and illustrating the first increment of weld metal in the first one of the two coequal component weld surface areas at one of the sides of the divider land or keel following the preliminary or tack-welding operation illustrated in FIG. 5;

FIG. 7 is a view similar to FIG. 6, but illustrating the next successive step in the new welding method and showing the deposition of an increment of weld metal in the other one of the two coequal component weld surface areas at the opposite side of the divider land or keel from that at which the deposition of the first welding pass or layer is shown in FIG. 6;

FIGS. 8, 9, 10 and 11 are views, partly in elevation and partly in section, illustrating the operation of applying successive increments of weld metal in each of the coequal component weld surface areas at opposite sides of the divider land or keel in successive steps or passes until the welding operation has been completed, as illustrated in FIG. 11;

FIG. 12 is a sectional view illustrating the manner in which the weld metal is applied to one of the coequal component weld surface areas at one side of the divider land or keel;

FIG. 13 is a sectional view similar to FIG. 12, but illustrating the manner in which the weld metal is applied to the other component weld surface area at the opposite side of the divider land or keel from that at which the weld metal is shown as being applied in FIG. 12;

FIG. 14 is a sectional view illustrating the new metal coupling completely welded to the metal pipe or tube;

FIG. 15 is a sectional view illustrating the present invention as employed to weld a solid round metal lug to a metal pipe or tube;

Figure 16:
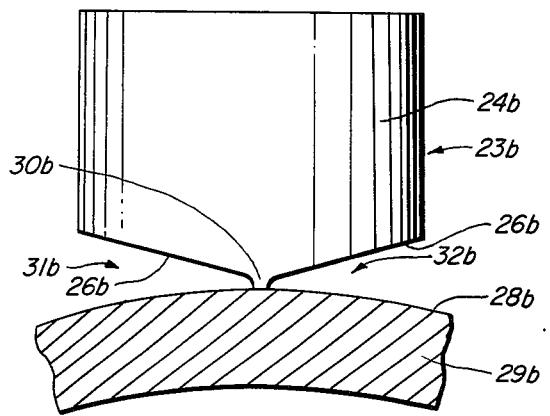
FIG. 16 is a view similar to FIG. 3, partly in section and partly in elevation, but illustrating the first step in a modification of the new welding method which is embodied in the present invention and which is illustrated in FIGS. 16 to 21, inclusive.
Figure 17:
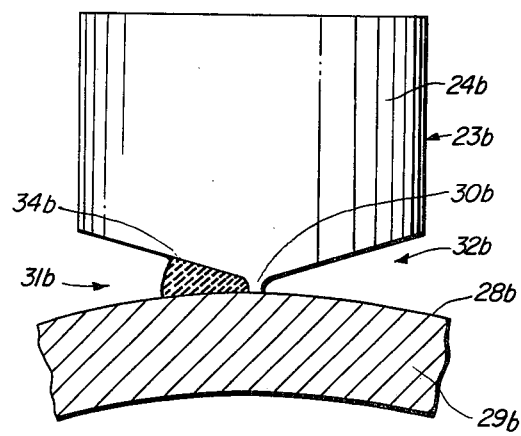
FIG. 17 is a view similar to FIG. 16, but illustrating the second step in the modification of the new welding method illustrated in FIGS. 16 to 21, inclusive.

DESCRIPTION OF A TYPICAL AND REPRESENTATIVE PRIOR ART METAL COUPLING AND THE METHOD OF WELDING IT TO A METAL PIPE OR TUBE

A typical prior art metal coupling is illustrated in FIGS. 1 and 2 of the drawings, wherein it is generally indicated at 15, and is adapted to be welded to the external peripheral wall surface of a metal pipe or tube 16. The metal coupling 15 includes a generally cylindrical-shaped body 17 which may have a central cavity therein (not shown) which, in use, is drilled to provide a fluid inlet to or an outlet from the interior of the metal pipe or tube 16 so that the assembled metal pipe or tube 16 with the metal coupling 15 welded thereto may be used in the petroleum and petrochemical industries, the chemical industries, in general, or for other industrial uses.

The generally cylindrical-shaped body 17 of the prior art metal coupling 15 has a relatively sharply inclined generally frusto-conical shaped or beveled base 18 on the bottom of which and centrally thereof an annular flange 19 is formed. In a typical prior art metal coupling, such as the metal coupling 15, the angle formed by a plane drawn horizontally through the bottom of the annular flange 20 and the beveled bottom surface 18 of the base of the generally cylindrical shaped body 17 of the metal coupling 15 may be in the order of 45°, as illustrated in FIG. 1.

In the practice of the prior art, as described above, the metal coupling 15 may be manually held in position, or held by means of a suitable fixture, at the desired point on the peripheral surface of the metal pipe or tube 16, and with the annular flange 19 spaced slightly above the peripheral surface of the metal pipe or tube 16, to provide a gap 44 between the annular flange 19 and the external peripheral wall surface of the metal pipe or tube 16, as shown in FIG. 1, or the coupling 15 may be positioned with the annular flange 19 in contact with the peripheral surface of the metal pipe or tube 16. In either case, it has been customary in the prior art to weld the metal coupling 15 to the external peripheral wall surface of the metal pipe or tube 16 by first tack-welding the annular flange 19 to the external peripheral wall surface of the metal pipe or tube 16 and then completing the weld joint, usually with the welder working in a generally horizontal plane or in a vertical direction, by attempting to apply the weld metal uniformly and circumferentially around the annular flange 19 and between the annular flange 19 and the frusto-conical shaped beveled base 18 of the metal coupling 15 and, in the form shown in FIG. 1, in the gap 44 between the annular flange 19 and the external peripheral wall surface of the metal pipe or tube 16; the weld area thus defined being indicated at 22 in FIG. 1, and its outer marginal edge thereof being thus defined by the bracket 22 in FIG. 1.

In practice, however, it has been found to be very difficult for the welder to make a perfect and uniform weld joint in the weld area 22 between the metal coupling 15 and the external peripheral wall surface of the metal pipe or tube 16 since to apply the weld metal in the weld area 22 necessitates that the welder work in a horizontal plane or vertical direction, or in some other difficult position, in attempting to apply the weld metal in the weld area 22 circumferentially and uniformly around the annular flange 19 of the metal coupling 15 and between the beveled wall surface of the frust-conical shaped base 18 and the adjacent external peripheral wall surface of the metal pipe or tube 16. The difficulties heretofore experienced in the prior art, as discussed above, have frequently resulted in the formation of imperfect weld joints having slag or incomplete fusion or other imperfections therein.

DESCRIPTION OF THE PRESENT INVENTION AS ILLUSTRATED IN FIGS. 3 TO 14, INCLUSIVE, OF THE DRAWINGS

A preferred and typical embodiment and practice of the present invention, and of the new method of welding a metal attachment in the form of a ferrous or like metal coupling, or other metal attachment, such as a solid heavy round metal lug, to a tubular metal supporting member in the form of a ferrous or like metal pipe or tube, are illustrated in FIGS. 3 to 14, inclusive, of the drawings, and are shown as embodying a new metal coupling 23 which includes a generally cylindrical ferrous or like metal body 24 which may have therein a central cavity 25 (FIGS. 12, 13 and 14) and a relatively shallow beveled bottom surface or base 26 which cooperates with the external peripheral wall surface 28 of the metal pipe or tube 29, to which the metal attachment or coupling 23 is to be welded, to define a total weld surface area 27 (FIG. 3) and the outer marginal edge portion of which is defined by the bracket 27 in FIG. 3.

The generally cylindrical body 24 of the new metal coupling 23 embodies a divider land or keel 30 which extends centrally and diametrically across the beveled bottom surface or base 26 thereof and divides the beveled bottom surface or base 26 of the generally cylindrical body 24 of the metal coupling 23 into two generally coequal component weld surface areas 31 and 32 which are arranged on opposite sides of the divider land or keel 30 and each of which is defined by one side of the divider land or keel 30, one-half of the beveled bottom surface or base 26 of the metallic body 24 of the metal coupling 23, and the adjacent portion of the external outer or peripheral wall surface 28 of the metal pipe or tube 29 (FIGS. 3, 6 to 14, inclusive).

In a typical and preferred embodiment of the new metal coupling 23 the angle formed by the beveled bottom surface or base 26 and a horizontal plane drawn through the bottom of the divider land or keel 30, is in the order of 10°, as indicated in FIG. 3. Hence, a substantially smaller body of weld metal is required to form the complete weld joint 33 (FIGS. 11 and 14) in the weld surface area 27 (FIG. 3) than is required in the prior art practice of welding prior metal couplings, as 15, to a metal pipe or tube 16 and in which the angle formed by a horizontal plane through the bottom of the annular flange 19 at the bottom of the beveled base 18 of the body 17 of the metal coupling 15, and the surface of the beveled base 18, may be, as pointed out above, in the order of 45°, and the weld surface area 22 thus correspondingly large, as shown in FIG. 1.

In the practice of the present invention, the new metallic coupling 23 is positioned at the desired position at the external peripheral wall surface 28 of the metal pipe or tube 29, as shown in FIGS. 3 and 5, with the divider land or keel 30 spaced slightly above the external peripheral wall surface 28 of the metal pipe or tube 29, to provide a gap 45 between the external peripheral wall surface 28 of the metal pipe or tube 29, the bottom of the divider land or keel 30, and the beveled bottom surface or base 26 of the metal coupling 23, as shown in FIG. 3. The metal coupling 23 may then be held manually, or by means of a suitable fixture, in the desired position relative to the external peripheral wall surface 28 of the metal pipe or tube 29.

The metal pipe or tube 29 and the metal coupling 23 are then preliminarily or tack-welded together as at 47, in FIG. 5, and subsequently positioned, as in FIG. 12, with the component weld surface area 31 facing upwardly or in a generally vertical plane. The welder, using a welding torch or like welding tool and weld metal, both generally indicated at 44 (FIGS. 12 and 13), then applies an increment of weld metal, between the body 24 of the metal coupling 23 and the external peripheral wall surface 28 of the metal pipe or tube 29, as at 34, in the first component weld surface area 31 (FIG. 6). The metallic pipe or tube 29, with the metal coupling 23 thus attached thereto, by virtue of the increment of weld metal deposited in the weld surface area 31, is then given a further increment of deposited weld metal in the other or second component weld surface area 32, as at 35 (FIG. 7). During this operation the metal pipe or tube 29 with the metal coupling 23 thus partially welded thereto is positioned, as in FIG. 13, with the second component weld surface area 32 disposed in a generally vertical plane.

The welder then alternately rotates the metal pipe or tube 29 with the metal coupling 23 thus partially welded thereto, in both of the component weld surface areas 31 and 32, as in FIG. 7, back and forth, through successive passes or positions, as illustrated in FIGS. 12 and 13, while applying successive increments of weld metal 36-37-38-39-40 and 41, in each of the two component weld surface areas 31 and 32, in each successive step or pass, as illustrated in FIGS. 8 to 11, inclusive, of the drawings, until the metal coupling 23 is completely welded to the outer peripheral wall surface 28 of the metal pipe or tube 29, and the weld joint 33 is completed, as illustrated in FIGS. 11 and 14, and in which the outer perimeter of the completed weld joint 33 in the weld surface area 27 (FIG. 3) is indicated at 46 in FIGS. 11 and 14.

It will be noted, in this connection, as shown in FIGS. 6 to 11, inclusive, and FIG. 14, that in forming the weld joint 33, as described above, weld metal 48 is applied under the divider land or keel 30 and between the divider land or keel 30 and the external peripheral wall surface 28 of the metal pipe or tube 29.

During the welding operation, as thus described, the number of times which the metal pipe or tube 29 and attached metal coupling 23 are rotated back and forth in successive steps or passes to apply successive increments of weld metal thereto in the weld surface areas 31 and 32 depends upon the welding and metallurgical variables involved in the welding operation, the size of the metal coupling 23 and of the metal pipe or tube 29, and other variable factors, and in an average case the number of such passes may vary from 4 to 10 successive passes for each of the two component weld surface areas 31 and 32.

After completion of the welding operation, in which a metal coupling, as 23, is employed, a central passage may be drilled from the central cavity 25 in the body 24 of the metal coupling 23 and through the beveled base 26 thereof and the divider land or keel 30, and through the weld joint 33 (FIG. 14), and through the wall of the metal pipe or tube 29, to provide fluid flow communication between the interior of the metal pipe or tube 29 and another fluid-conducting member which may be attached to the thus drilled new metal coupling 23 in use.

THE MODIFICATION ILLUSTRATED IN FIG. 15

However, the present invention and the new welding method which forms a part thereof, are not limited to use with metal couplings, or in welding metal couplings to metal pipes or tubes, since it may be employed for welding other metal attachments, such as heavy and solid round metal lugs, to metal pipes or tubes, or other metal supports.

Thus, the use of the present invention with heavy round and solid metal lugs, and in welding them to a metal pipe or tube, is illustrated in FIG. 15 of the drawings, wherein a solid generally cylindrical metal lug is generally indicated at 42; those parts in the form of the invention illustrated in FIG. 15 which are similar to or comparable to parts in the form of the invention illustrated in FIGS. 3 to 14, inclusive, being given the same reference numerals followed by the additional and distinguishing reference character "a".

It will be noted, by reference to FIG. 15, that the round solid metal lug 42 includes a solid and generally cylindrical body 43 which has a divider land or keel 30a extending diametrically across the beveled bottom surface 26a of the metal body 43 and dividing the weld surface area 27a into two substantially coequal component weld surface areas 31a and 32a which are welded in successive steps or passes and increments to complete the weld joint 33a, as described hereinbefore in connection with the practice of the invention as illustrated in FIGS. 3 to 14, inclusive.

The round solid metal lugs, as 42, when welded to the external peripheral wall surface 28a of the metal pipe or tube 29a, or other metal support, may be used to provide supporting or guiding means in the use of the supporting metal pipe or tube 29a, and attached metal lug 42, as is well understood in the art.

THE MODIFICATION ILLUSTRATED IN FIGS. 16 TO 21, INCLUSIVE

A modification of the new method of welding embodied in the present invention is illustrated in FIGS. 16 to 21, inclusive, of the drawings and those parts thereof which are similar or comparable to corresponding parts in the form of the invention illustrated in FIGS. 3 to 14, inclusive, have been given the same reference numerals followed by the additional and distinguishing reference character "b".

In the practice of the modified form of the new welding method illustrated in FIGS. 16 to 21, inclusive, the metal coupling 23b is positioned at the desired point on the external peripheral wall surface 28b of the metal pipe or tube 29b and with the bottom surface of the divider land or keel 30b disposed in contact with the external peripheral wall surface 28b of the metal pipe or tube 29b, as shown in FIG. 16.

The metal coupling 23b is then tack-welded at the divider land or keel 30b to the external peripheral wall surface 28b to the metal pipe or tube 29b in a manner similar to the tack-welding illustrated in FIG. 5, whereupon the welding operation proceeds in substantially the same manner as hereinbefore described in connection with the welding method and operation illustrated in FIGS. 3 to 14, inclusive, to complete the weld joint 33b, with a certain variation thereof, which will now be described.

Figure 18:
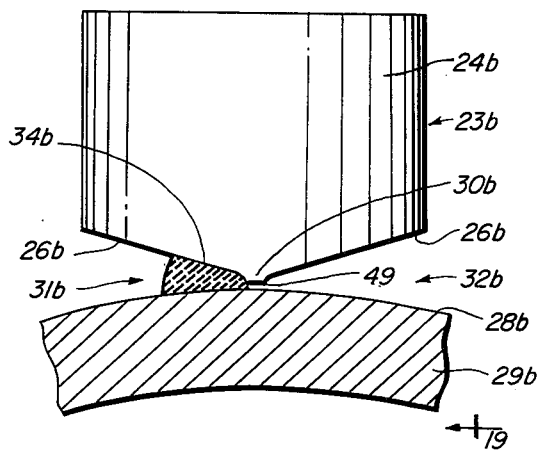
FIG. 18 is a view similar to FIG. 17, but illustrating the next step in the modification of the new welding method illustrated in FIGS. 16 to 21, inclusive.
Figure 19:
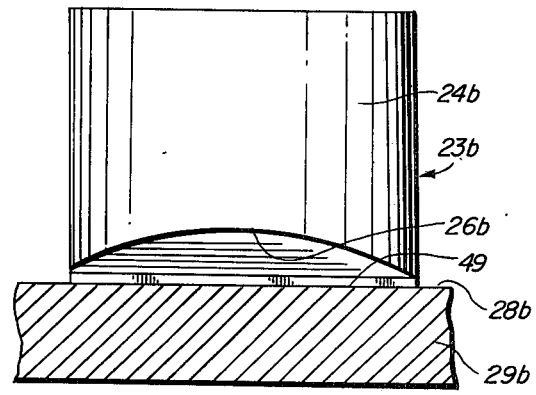
FIG. 19 is a view on line 19—19 in FIG. 18, partly in section and partly in elevation.
Figure 20:
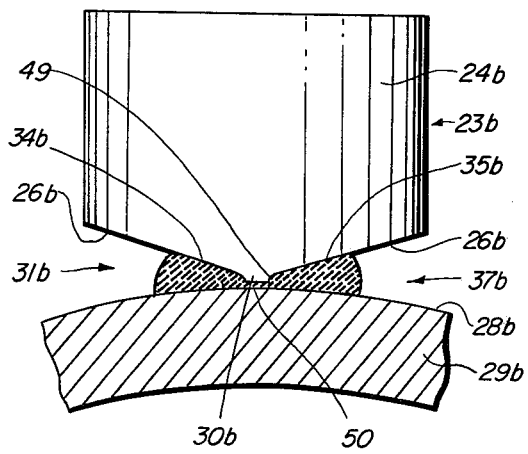
FIG. 20 is a view partly in section and partly in elevation illustrating the next step in the practice of the modification of the invention illustrated in FIGS. 18 to 21, inclusive.
Figure 21:
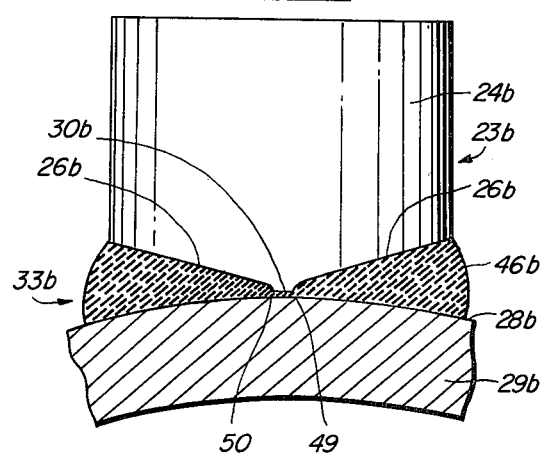
FIG. 21 is a view partly in section and partly in elevation illustrating the complete weld joint made in accordance with the modification of the invention illustrated in FIGS. 16 to 21, inclusive.

Thus, in the practice of the modification of the invention illustrated in FIGS. 16 to 21, inclusive, after the welder has deposited the first increment of weld metal 34b in the weld surface area 31b, he grinds a slot or passage 49 (FIGS. 18 and 19) in the divider land or keel 30b from the side of the divider land or keel opposite to that on which he has deposited the first weld metal increment 34b through the body of the divider land or keel 30b and into the body of the weld increment 34b. This slot or passage 49 extends from end to end of the divider land or keel 30b in the bottom portion thereof and immediately above the external peripheral wall surface 28b of the metal pipe or tube 29b, as shown in FIGS. 18 and 19. Hence, when the next weld increment 35b is applied in the weld surface area 32b a body of weld metal 50 will flow through the slot or passage 49 into and integrally merge or fuse with the body of the weld increment 34b in the weld surface area 31b, as shown in FIGS. 20 and 21, and thus assure that the increment of weld metal 34b in the weld surface area 31b, and the subsequently applied weld increment 35b in the weld surface area 32b will be integrally welded or fused together to form a uniform and satisfactory weld joint at both sides of the divider land or keel 30b, as shown in FIG. 21.

This modification of the invention illustrated in FIGS. 16 to 21, inclusive, is particularly useful and desirable in practicing the form of the invention illustrated in FIG. 16 of the drawings, and in which the divider land or keel 30b is positioned in contact with the external peripheral wall surface 28b of the metal pipe or tube 29b but may also be advantageously employed in the practice of the preferred form of the invention illustrated in FIGS. 3 to 14, inclusive, and in which the divider land or keel 30 is positioned above the external peripheral wall surface 28 of the metal pipe or tube 29 to provide the gap 45 (FIGS. 3 and 5) at the start of the welding operation.

It will thus be seen from the foregoing description, considered in conjunction with the accompanying drawings, that the present invention provides a new and improved metal coupling, or like metal attachment, and a new and improved method of welding a metal coupling, or like metal attachment, such as a round solid metal lug, to a metal pipe or tube, or other metal support, and a new and improved weld joint therebetween, and that the invention thus overcomes the problems and difficulties heretofore experienced in the prior art and has the desirable advantages and characteristics and accomplishes its intended objects including those hereinbefore pointed out and others which are inherent in the invention.

I claim:

1. A metallic attachment adapted to be welded to the external surface of a metal pipe or tube comprising:
    (a) a generally cylindrical metallic body including
    (1) a base having
        a. a beveled bottom surface defining a weld surface area adapted to be welded to the said external surface of the said metal pipe or tube and having
        b. a divider portion in the form of a keel or land extending downwardly from and generally diametrically across the said beveled bottom surface of the said base centrally thereof and dividing the said weld surface area of the said base into two substantially coequal component weld surface areas on opposite sides of the said divider portion;

(2) the said keel or land having opposite generally parallel sides;

(3) the said generally cylindrical body of the said metallic attachment having an outer peripheral wall surface; and (4) each of said substantially coequal component weld surface areas of the said base being defined by one side of the said keel or land, the outer peripheral wall surface of the said generally cylindrical body of the said metallic attachment, the said beveled bottom surface thereof, and a portion of the adjacent external peripheral wall surface of the said metal pipe or tube.

2. A metallic attachment as defined in claim 1 in which (a) the angle formed by each of the said substantially coequal component weld surface areas of the said beveled bottom surface of the said base and a horizontal plane through the bottom of the said land or keel on opposite sides of the said keel or land and the outer peripheral wall surface of the said generally cylindrical body is in the order of 10°.

3. A metallic attachment in the form of a metal coupling adapted to be welded to the surface of a tubular metal member comprising (a) a metallic body having therein
  (1) a central cavity; and including
  (2) a base having
    a. a beveled bottom surface defining a weld surface area adapted to be welded to the said surface of the said tubular metal member; and
    b. the said beveled bottom surface of the said base having a depending portion extending downwardly from and across the said beveled bottom surface of the said base and dividing the said weld surface area thereof into component weld surface areas disposed on opposite sides of the said depending portion.

4. A metallic attachment in the form of a metal coupling as defined in claim 3 in which (a) the said base of the said metallic body is generally circular in form; and (b) in which the said depending portion divides the weld surface area of the said beveled bottom surface of the said base into two substantially coequal component weld surface areas on opposite sides of the said depending portion.

5. A metallic attachment adapted to be welded to the external surface of a metal pipe or tube comprising:

(a) a metallic body in the form of a solid metal lug including
  (1) a base having
    a. a beveled bottom surface defining a weld surface area adapted to be welded to the said external surface of the said metal pipe or tube and having
    b. a divider portion extending downwardly from and across the said beveled bottom surface of the said base and dividing the said weld surface area thereof into component weld surface areas at each side of the said divider portion.

6. A metallic attachment adapted to be welded to the external surface of a metal pipe or tube comprising:

(a) a metallic body in the form of a solid generally cylindrical metal lug including
  (1) a base having
    a. a beveled bottom surface defining a weld surface area adapted to be welded to the said external surface of the said metal pipe or tube and having
    b. a divider portion extending downwardly from and across the said beveled bottom surface of the said base and dividing the said weld surface area thereof into component weld surface areas at each side of the said divider portion.

7. A metallic attachment adapted to be welded to the external surface of a metal pipe or tube comprising:

(a) a metallic body in the form of a solid generally cylindrical metal lug including
  (1) a base having
    a. a beveled bottom surface defining a weld surface area adapted to be welded to the said external surface of the said metal pipe or tube and having
    b. a divider portion extending downwardly from and across the said beveled bottom surface of the said base and dividing the said weld surface area thereof into component weld surface areas at each side of the said divider portion;
  (2) the said divider portion dividing the said weld surface area of the said base into two substantially coequal component weld surface areas on opposite sides of the said divider portion.

8. A metallic attachment adapted to be welded to the external surface of a metal pipe or tube comprising:

(a) a metallic body in the form of a solid generally cylindrical metal lug including
  (1) a base having
    a. a beveled bottom surface defining a weld surface area adapted to be welded to the said external surface of the said metal pipe or tube and having
    b. a divider portion extending downwardly from and across the said beveled bottom surface of the said base and dividing the said weld surface area thereof into component weld surface areas at each side of the said divider portion;
    c. the said divider portion dividing the said weld surface area of the said base into two substantially coequal component weld surface areas on opposite sides of the said divider portion; and
    d. the said divider portion being in the form of a keel or land extending generally diametrically across the said beveled bottom surface of the said base centrally thereof.

* * * * *